(12) United States Patent
Sugure et al.

(10) Patent No.: US 7,290,124 B2
(45) Date of Patent: Oct. 30, 2007

(54) DATA PROCESSOR EMPLOYING REGISTER BANKS WITH OVERFLOW PROTECTION TO ENHANCE INTERRUPT PROCESSING AND TASK SWITCHING

(75) Inventors: Yasuo Sugure, Hachioji (JP); Tomomi Ishikura, Kokubunji (JP); Kazuya Hirayanagi, Komae (JP); Takeshi Kataoka, Tokyo (JP); Seiji Takeuchi, Higashimurayama (JP); Hiromichi Yamada, Hitachi (JP); Takanaga Yamazaki, Tama (JP)

(73) Assignee: Renesas Technology Corp., Tokyo (JP)

( * ) Notice: Subject to any disclaimer, the term of this patent is extended or adjusted under 35 U.S.C. 154(b) by 445 days.

(21) Appl. No.: 10/690,643

(22) Filed: Oct. 23, 2003

(65) Prior Publication Data

US 2004/0107337 A1    Jun. 3, 2004

(30) Foreign Application Priority Data

Nov. 5, 2002    (JP)    ............................. 2002-320788

(51) Int. Cl.
    *G06F 9/48*    (2006.01)
(52) U.S. Cl. ...................................... 712/244; 712/228
(58) Field of Classification Search ................ 712/228, 712/233, 202, 244
    See application file for complete search history.

(56) References Cited

U.S. PATENT DOCUMENTS 3,810,117 A * 5/1974 Healey ........................ 711/3
5,640,582 A * 6/1997 Hays et al. .................... 712/38
5,696,957 A   12/1997 Yamaura et al. ............. 395/569
6,108,767 A * 8/2000 Damron ...................... 712/202
6,487,630 B2 * 11/2002 Bui ............................. 711/109
6,223,279 B1  4/2003 Nishimura et al. ......... 712/228
7,024,541 B2 * 4/2006 Thimmanagari et al. .... 712/218

FOREIGN PATENT DOCUMENTS

| JP | 5-165641 | 7/1993 |
| JP | 5-265753 | 10/1993 |
| JP | 6-309169 | 11/1994 |

OTHER PUBLICATIONS

Weldon et al., "Quantitative Evaluation of the Register Stack Engine and Optimizations for Future Itanium Processors," Proceedings of the 6th Annual Workshop on Interaction Between Compilers and Computer Architectures, 2002.*

* cited by examiner

*Primary Examiner*—Eddie Chan
*Assistant Examiner*—David J. Huisman
(74) *Attorney, Agent, or Firm*—Miles & Stockbridge P.C.

(57) ABSTRACT

The present invention prevents a data processor from undesirable operation stop due to an overflow of a plurality of register banks. A status register includes an overflow flag to indicate an overflow of the plurality of register banks. When an interrupt exception occurs in a state in which data has been saved to all banks of the register banks, and the accepted interrupt exception is permitted to use the register banks, a central processing unit saves data of a register set to a stack area and reflects an overflow state in the overflow flag. When the overflow flag indicates an overflow state, if data restoration from the register banks to the register set is directed, the central processing unit restores the data from the stack area to the register set.

11 Claims, 9 Drawing Sheets

| MNEMONIC | OPERATION CONTENTS |
|---|---|
| LDBANK @Rm, R0 | 4-BYTE DATA FROM A REGISTER BANK ADDRESS INDICATED BY Rm IS TRANSFERRED TO R0 |
| STBANK R0, @Rn | R0 IS TRANSFERRED TO A REGISTER BANK ADDRESS INDICATED BY Rn |

DATA PROCESSOR EMPLOYING REGISTER BANKS WITH OVERFLOW PROTECTION TO ENHANCE INTERRUPT PROCESSING AND TASK SWITCHING

BACKGROUND OF THE INVENTION

The present invention relates to a data processor including register banks, more particularly to register set saving and restoring involved in interrupt exception (refers to both interrupts and exceptions) handling and task switching, and a technique effectively applied to, e.g., single chip microcomputers.

When interrupt exception handling or task switching under multitask environments is performed, a predetermined register set such as general purpose registers, a status register, and the like at that time is saved to enable restoration to a previous state. Although a stack area allocated to an external memory and the like can be used as a save destination, register banks can be used to rapidly save and restore the register set. Use of the register bank method shortens interrupt response time.

Patent Publication 1 describes a single-chip microcomputer including general purpose registers of bank structure by use of an internal RAM (random access memory), provided with a dedicated bus for that purpose. Patent Publication 2 describes an information processing unit having a register bank configuration in which a dedicated bus is provided between a register file and an internal RAM. Patent Publication 3 describes an extended central processing unit having a register file configuration with a dedicated bus provided between the register file and an internal RAM.

[Patent Publication 1]
Japanese Unexamined Patent Publication No. Hei 5 (1993)-165641

[Patent Publication 2]
Japanese Unexamined Patent Publication No. Hei 6 (1994)-309169

[Patent Publication 3]
Japanese Unexamined Patent Publication No. Hei 5 (1993)-265753

SUMMARY OF THE INVENTION

The inventor studied a register bank method to shorten interrupt response time. First, an overflow of register banks is taken into account. When an interrupt occurs, some interrupt service routines mask only a critical section having a high priority level such as interrupt factor flag clear with the interrupt level, and after servicing the interrupt, accept re-input of interrupts of the same or lower levels. In such a case where interrupt service is performed by intentionally lowering interrupt levels, since more interrupts than the number of interrupt levels occur, register banks provided by the number of interrupt levels overflows. As a result, a CPU (central processing unit) taking no measures against overflow may undesirably stop operation. Second, in the case where an OS (operating system) is used, task switching by interrupt is taken into account. Specifically, in task switching, after data of a register set before the task switching is saved to an OS internal table, data of the register set on tasks after the switching must be restored from the OS internal table to the register set. Unless such processing is performed, control cannot be returned to a previous task again.

The present invention provides a technique for preventing a data processor from malfunctioning on saving and restoring register banks.

An object of the present invention is to provide a data processor that is free from undesirable operation stop due to an overflow of register banks.

Another object of the present invention is to provide a data processor that can smoothly and efficiently perform restoration from interrupts, whether task switching is involved or not, and is excellent in applicability to multitask processing.

The foregoing and other objects, and novel features of the present invention will become apparent from this specification and the accompanying drawings.

Representative examples of the invention disclosed in the present application will be briefly described below.

[1] In a data processor that uses a status register and plural register banks to execute instructions, the status register includes an overflow flag to indicate an overflow of the plural register banks.

As a further embodiment of the present invention, the data processor comprises: a status register; a central processing unit (CPU) including a predetermined register set; and a plurality of register banks corresponding to the predetermined register set, wherein the plurality of register banks are used to save storage information held by the predetermined register set when an interrupt occurs, and the status register includes an overflow flag to indicate an overflow of the plural register banks.

By providing the overflow flag, when data is restored to the register set, an overflow of the register banks can be recognized.

For example, when an interrupt exception occurs in a state in which data has been saved to all banks of the register banks, and the accepted interrupt exception is permitted to use the register banks, the central processing unit saves data of the register set to a stack area and reflects an overflow state in the overflow flag. When the overflow flag indicates an overflow state, if data restoration from the register banks to the register set is directed, the central processing unit restores the data from the stack area to the register set.

It is to be noted that, in the interrupt exception handling, the status register including the overflow flag and the program counter are saved to a stack area, and an interrupt restore instruction (RTE instruction) restores the values of the program counter and the status register from the stack area. Specifically, even if interrupt service processing is multiplexed, any interrupt service routines can determine whether the register banks have overflowed due to an interrupt concerned by observing the overflow flag (overflow bit) in the status register.

However, in cases where task switching by the OS is performed by interrupts, before execution of an instruction (RTE instruction) to restore from an interrupt service routine, a status register value corresponding to a switching destination task must be prepared in advance in a stack area where restore values are placed. This is operation indispensable to task switching processing in the OS and not extra processing added by the present invention.

This helps to prevent the data processor from undesirable operation stop due to an overflow of the register banks.

When an interrupt exception occurs in a state in which data has been saved to all banks of the register banks, and the accepted interrupt exception is not permitted to use the register banks, the CPU executes a predetermined exception handling routine.

The plural register banks are constituted by a RAM, a dedicated bus is used for connection between the RAM and a predetermined register set, and the bus is given as many bits as parallel data transfer is allowed in units of plural registers contained in the register set. Interrupt exception handling can be performed in parallel with save processing for the register set through the dedicated bus, resulting in a higher interrupt response speed. In short, concurrent saving of plural registers contributes to reduction in interrupt service time (interrupt response performance and interrupt restore performance). By connecting the bank area over the dedicated bus to perform parallel processing, apparent overhead of register save and restore processing can be reduced.

[2] We will examine the case where interrupt exception handling is used to perform OS-based task switching. The central processing unit starts saving to the register banks in response to the occurrence of interrupt exception handling. Upon return from an interrupt service routine, the central processing unit executes a register restore instruction (RESBANK instruction) and restores storage information from a register bank last saved to the predetermined register set. At this time, if a return destination from the interrupt service routine is a different task, that is, task switching is performed, according to the OS, the central processing unit stores general purpose registers of a task before the switching to a store area of the OS, and restores stored data on a task after the switching from the management area of the OS to the register set. Thereafter, the central processing unit restores the value of a program counter value and the value of the status register stored in a stack area, prepared by the OS, and executes a return instruction (RTE instruction) to enable program execution processing at a switching destination. What is important here is that the central processing unit to save the values of registers to the register banks upon the occurrence of an interrupt must separately have the register restore instruction (RESBANK instruction) and the return instruction (RTE instruction) to perform OS-based task switching. If task switching is not involved, the OS-based task switching following the processing of the register restore instruction become unnecessary, and there is no need to separate processing of the register restore instruction and processing of the return instruction; restoration from the register banks may be performed by an instruction (RTE instruction) to restore from the interrupt service routine. However, unifying the both instructions into one instruction makes task switching difficult.

According to a further embodiment, the data processor can perform interrupt exception handling according to control of the OS and can perform task switching, using the interrupt exception handling. In the interrupt exception handling, the predetermined register set is saved to register banks; an interrupt exception service routine (interrupt service routine) is executed; in return from the interrupt exception service routine, the register restore instruction (RESBANK instruction) is executed to restore data of a register bank used for a last save operation to the register set; and the return instruction (RTE instruction) is executed to return to previous program execution processing. In the task switching using the interrupt exception handling, in return from the interrupt exception handling routine, the register restore instruction is executed to restore data of a register bank in a task of a switching source to the register set; the restored data is stored in an area managed by the OS; register set data of a task of a switching destination is restored from the OS management area to the predetermined register set; and the return instruction is executed to transfer control to program execution processing of the task of the switching destination.

DESCRIPTION OF THE PREFERRED EMBODIMENTS

<<Register Bank>>

Figure 1:
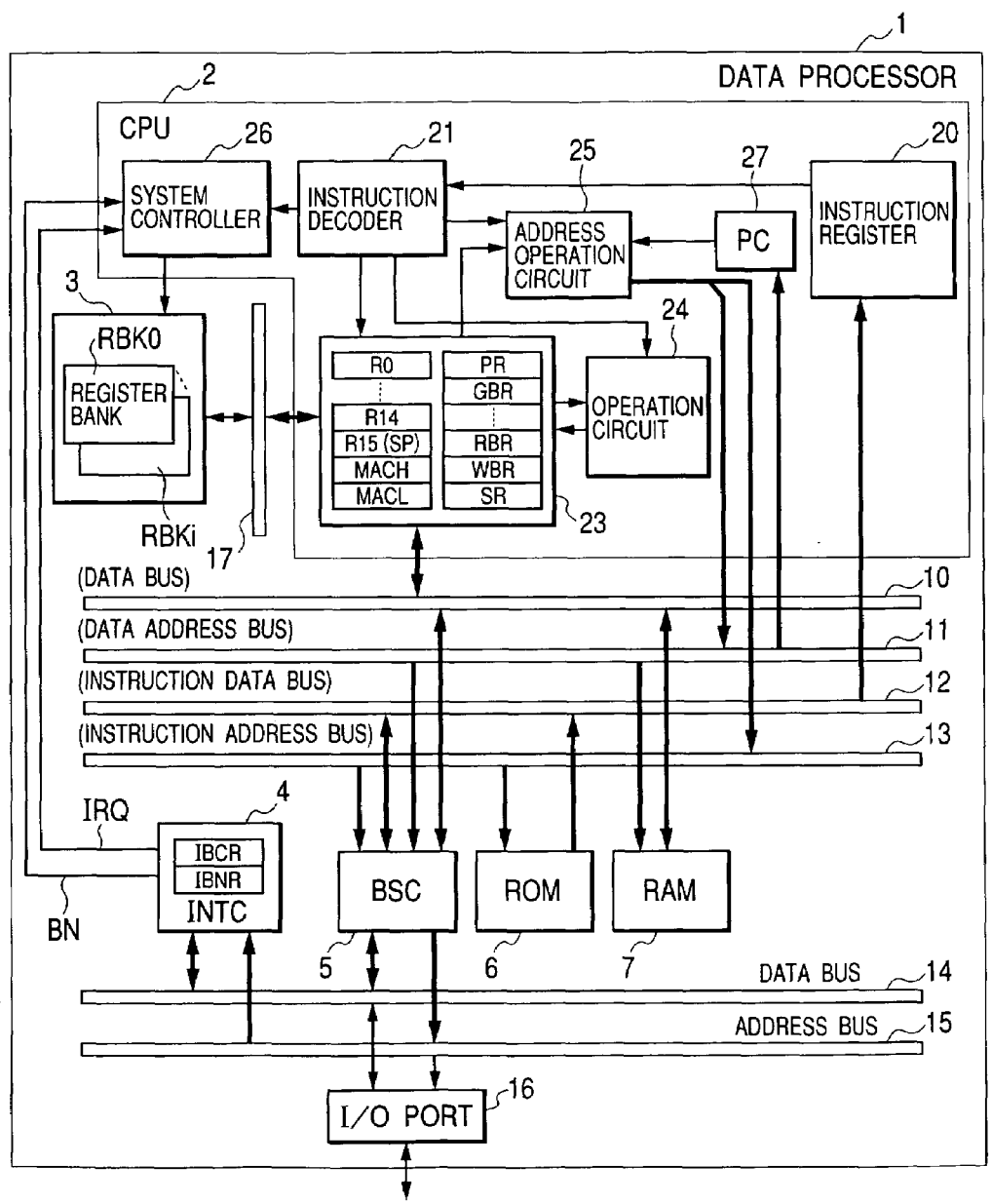
FIG. 1 is a block diagram showing a data processor according to an embodiment of the present invention.

FIG. 1 is a block diagram showing a data processor according to an embodiment of the present invention. A data processor 1 shown in the figure is formed on a single semiconductor board (semiconductor chip) such as a single-crystal silicon by, e.g., CMOS integrated circuit manufacturing technology.

The data processor 1 shown in the figure comprises: a CPU 2; a bank memory 3; an interrupt controller (INTC) 4; a bus state controller (BSC) 5; a ROM (read only memory) 6; and a RAM 7.

The CPU 2 is connected to the RAM 7 over a data bus 10 and a data address bus 11, and to the ROM 6 over an instruction data bus 12 and an instruction address bus 13. The RAM 7 is used as a work area or data temporary storage area of the CPU 2. The ROM 6 stores operation programs of the CPU 2 such as OS and control programs. The buses 10 to 13 are interfaced via the bus state controller 5 to a peripheral data bus 14 and a peripheral address bus 15, where external input-output circuits such as the interrupt controller 4 and an I/O port 16 are provided. The bank memory 3 comprises plural register banks RBK0 to RBKi, which are connected to the CPU 2 over a bus 17 dedicated to the register banks. The I/O port 16 is connected with a bus (not shown in the figure) outside the data processor.

The CPU 2 decodes an instruction fetched to an instruction register 20 in an instruction decoder 21, and according to a result of the decoding, controls a register circuit 23, an operation circuit 24, an address operation circuit 25, a system controller 26, and the like to execute the instruction. The address operation circuit 25, according to an instruction address owned by a program counter (PC) 27 and address information owned by the register circuit 23, outputs the instruction address to the instruction address bus 13 and an operand address to the data address bus 11. The interrupt controller 4 inputs interrupt requests from inside and outside the data processor, arbitrates them according to interrupt priority levels and the like, and upon accepting them, asserts an interrupt signal IRQ to the CPU 2. The interrupt signal IRQ may be composed of plural signal lines containing information of an interrupt vector number (IVN).

The operation circuit 24 comprises an arithmetic logic unit, shifter, multiplier, and the like, which are not shown in the figure. The register circuit 23 includes: general purpose registers R0 to R15 (SP); multiplication registers MACH and MACL; a procedure register PR; a global base register GBR; a read data buffer register RBR; a write data buffer register WBR; a status register SR; and the like.

The general purpose registers R0 to R15 can be used as address registers and data registers. To the general purpose register R15, functions as a stack pointer SP are assigned, in addition to functions as a general purpose register. During an interrupt or subroutine call, a return address and general purpose registers are saved and restored to and from a stack area, using the stack pointer. The stack pointer SP points to a stackable address of the stack area. The stack area is allocated to the RAM 7 or a memory (not shown in the figure) on an external bus connected to the I/O port 16.

The program counter (PC) 27 indicates the address of an instruction executed by the CPU 2. The status register SR indicates the status of the CPU 2. The procedure register PR stores a return address at a subroutine call.

Figure 2:
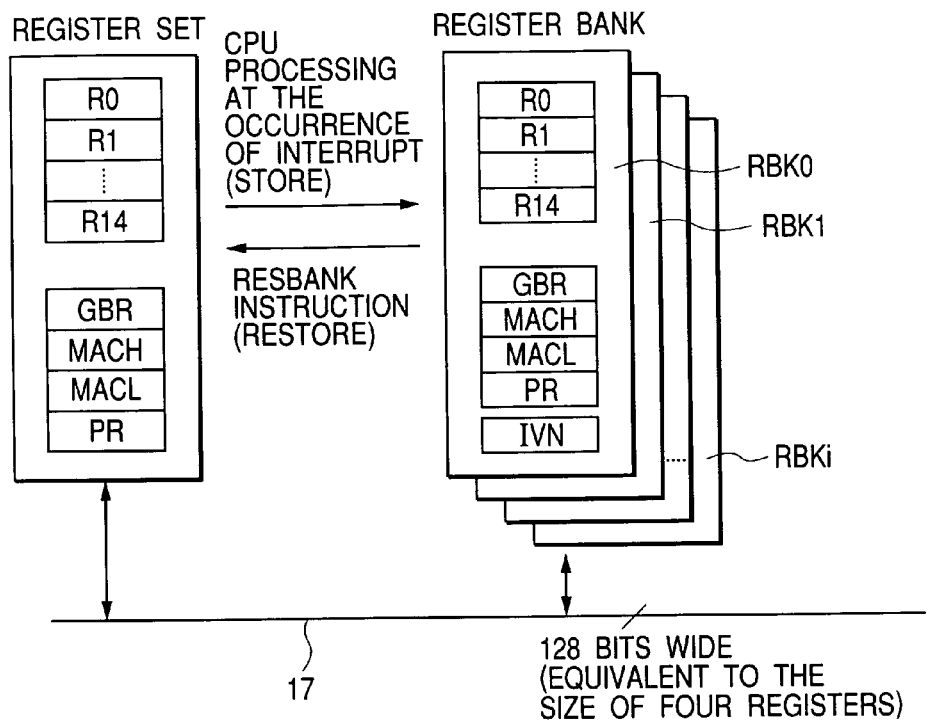
FIG. 2 is a diagram illustrating register banks and a register set to be saved and restored.

FIG. 2 shows register banks and a register set to be saved and restored. In this embodiment, for register saving and restoring in interrupt service, instead of conventional stack areas, the register banks RBK0 to RBKi are used as bank areas exclusively used to save registers. The register banks RBK0 to RBKi are allocated to a memory cell array of the bank memory 3. The bank memory 3 is implemented as, for example, SRAM (static random access memory).

The registers to be saved and restored are a predetermined register set whose contents could be destroyed due to interrupts, such as the general purpose registers R0 to R14, the global register GBR, the multiplication registers MACH and MACL, the procedure register PR, and a vector number (IVN) corresponding to a pertinent interrupt as debug information. Each of the register banks RBK0 to RBKi is assigned a storage capacity enough to hold the register set.

As for the number of the register banks RBK0 to RBKi, since registers must be saved and restored each time interrupts are nested (interrupts are multiplexed), it is desirable to provide a number of register banks equal, at the minimum, to the number of interrupt levels. If there are, e.g., 15 interrupt priority levels, 15 register banks RBK0 to RBKi should be provided.

The predetermined register set R0 to R14, GBR, MACH, MACL, PR, and vector number IVN are automatically stored in predetermined register banks by CPU processing when an interrupt occurs. The data (register set data) of the predetermined register set stored in the register banks is restored to the register set by the CPU 2 executing a predetermined register restore instruction. In this embodiment, a RESBANK instruction is used as the predetermined register restore instruction.

<<Control Registers for Saving and Restoring>>

Figure 3:
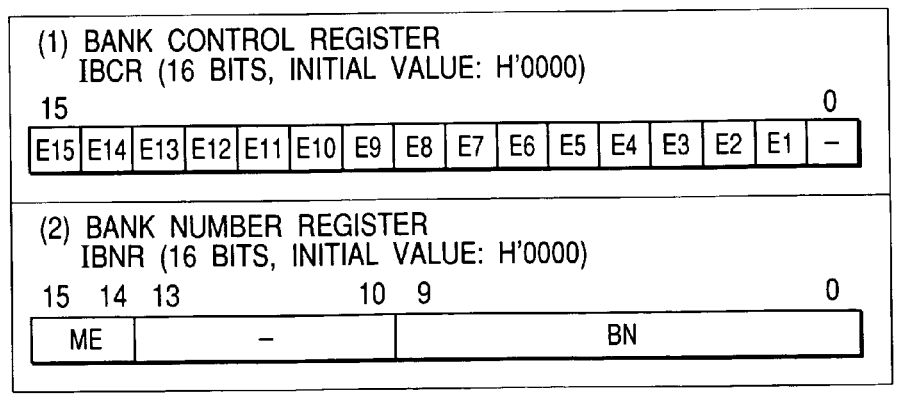
FIG. 3 is a diagram showing examples of control registers for saving and restoring a predetermined register set.

FIG. 3 shows examples of control registers for saving and restoring the predetermined register set. The interrupt controller 4 is provided with a bank control register IBCR and a bank number register IBNR. The bank control register IBCR is a register for defining whether to permit or prohibit the use of the register banks RBK0 to RBKi for interrupt priority levels or interrupt factors (interrupt requests). The interrupt priority levels range from 1 to 15, with greater levels indicating higher interrupt priorities and 0 being masked. Furthermore, the register banks are respectively associated with E1 to E15 defining whether to permit or prohibit their use, which are allocated to bits 1 to 15, respectively. "0" denotes prohibition of use and "1" denotes permission of use. Bit 0 is a reserved bit.

A bank number register IBNR shown in FIG. 3 has a master enable ME field and a bank number BN field. The master enable ME of "00" denotes that the use of the register banks is prohibited for all interrupts. In this case, the status of the bank control register IBCR is ignored. The master enable ME of "01" denotes that the use of the banks is permitted for all interrupts other than NMI (non-maskable interrupt). When the master enable ME is "11", the register banks are used according to the setting of the bank control register IBCR. "10" of the master enable ME is reserved. A bank number BN indicates the next bank number to be saved.

<<FILO Control of Register Banks>>

The register banks RBK0 to RBKi operate in the form of FILO (first in, last out); registers first entered are last removed. The FILO operation of the register banks RBK0 to RBKi involves control of the system controller 26 and the instruction decoder 21. The bank number BN is delivered to the system controller 26. The system controller 26 is supplied with an interrupt signal IRQ from the interrupt controller 4, and with a predetermined instruction decode signal from the instruction decoder 21. Other mode signals shown in the figures are supplied. The system controller 26 is implemented as a logic circuit that performs flow control for instruction execution, operation mode control, control of access to the bank memory 3, and the like.

Figure 4:
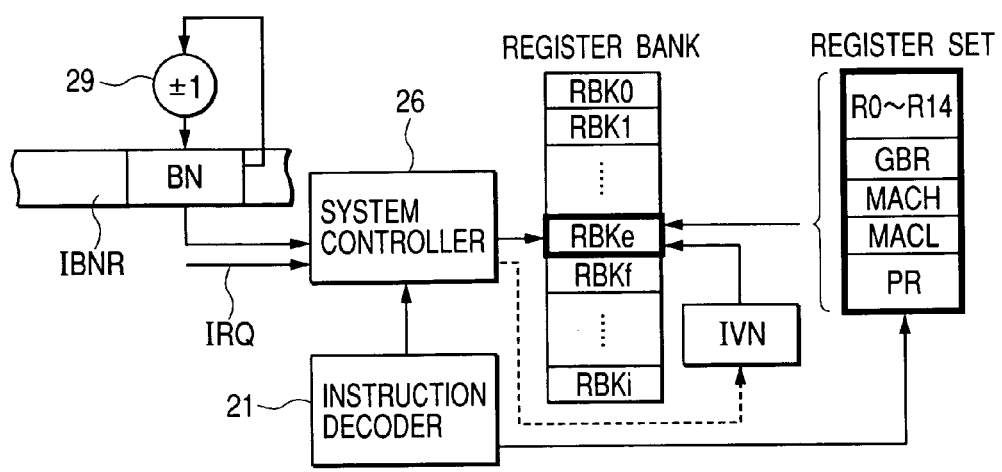
FIG. 4 is a diagram showing an operation configuration of register banks RBK0 to RBKi.

FIG. 4 shows an operation configuration of the register banks RBK0 to RBKi. A description is made of FILO access control over the bank memory 3 by the system controller 26. The value of the bank number BN is set to 0 immediately after reset. If an interrupt is accepted to use the register banks, the system controller 26 saves a register set to a bank indicated by the bank number BN and increments the bank number BN by 1. If the RESBANK instruction is executed, the system controller 26 decrements the bank number BN by 1 and then restores (data restore) register set data for the predetermined register set from a register bank indicated by the bank number BN. Increment and decrement operations on the bank number BN are performed by an incrementer/decrementer 29 within the controller 4.

<<Concurrent Execution of CPU Processing and Register Save Processing>>

Figure 5:
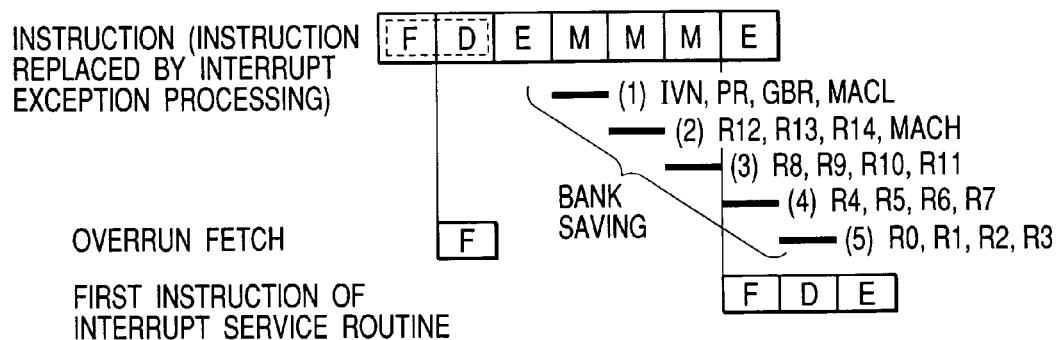
FIG. 5 is a timing chart showing how register save processing is performed concurrently with CPU processing when an interrupt occurs.

FIG. 5 shows how register save processing is performed concurrently with CPU exception handling when an interrupt occurs. Each of registers of the register set is, e.g., 32 bits long. In this case, the dedicated bus 17 for operating the register banks has a width of 128 bits to allow parallel input and output of, e.g., four registers. The wide bus width of the dedicated bus 17 enables concurrent transfer of plural registers and increases transfer efficiency. Since the dedicated bus 17 for operating the register banks is exclusively used for the register banks, the CPU 2 can perform save and restore processing for the register set concurrently with other processing. Register save processing is performed concurrently with CPU exception handling when an interrupt occurs, so that overhead by the register save processing can be apparently zeroed or greatly reduced. In FIG. 5, since saving of the register set is automatically started when an interrupt is accepted, it is started before the first instruction of an interrupt service routine is fetched according to an interrupt vector, resulting in further increased interrupt responsiveness.

Figure 6:
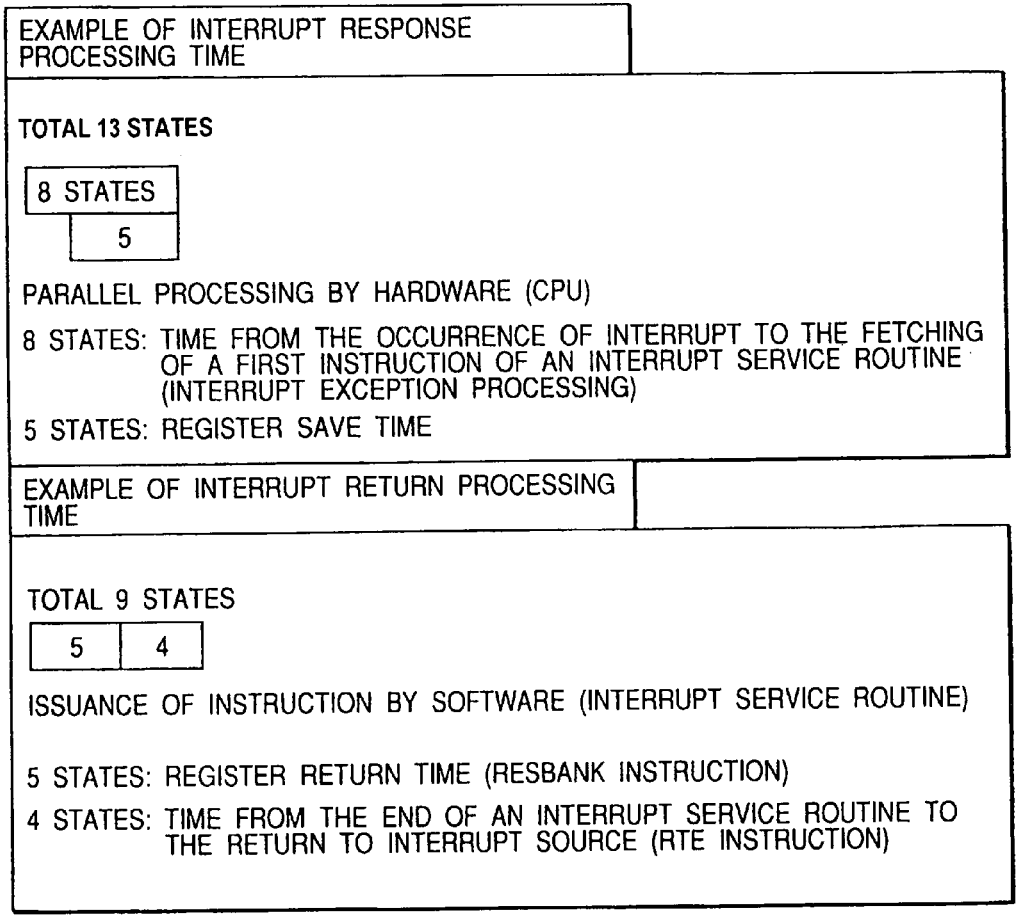
FIG. 6 is a diagram showing examples of interrupt response processing time and interrupt restore processing time when a register bank method is used.
Figure 7:
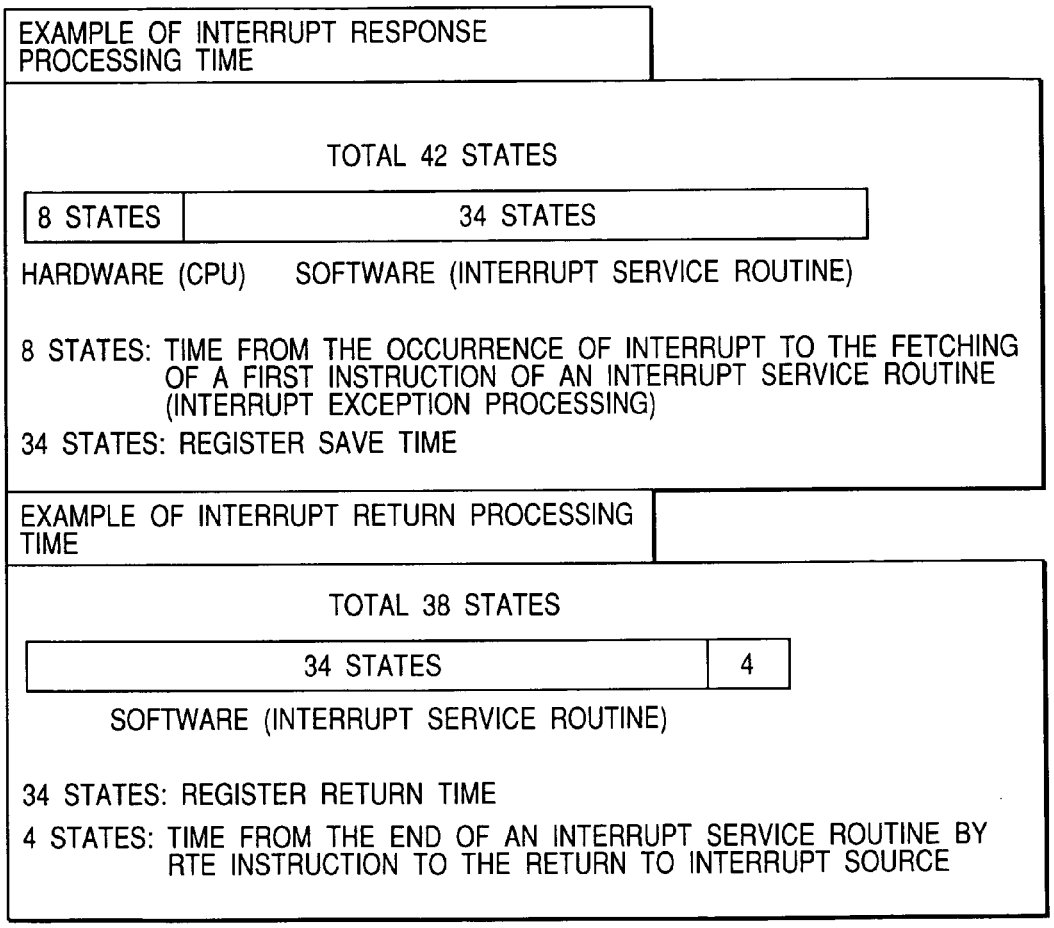
FIG. 7, which illustrates comparisons with FIG. 6, is a diagram showing examples of interrupt response processing time and interrupt restore processing time when saving and restoring to and from a stack area are performed using data transfer instructions without employing register banks.

FIG. 6 shows examples of interrupt response processing time and interrupt restore processing time when the above-described register bank method is used. To illustrate comparisons with FIG. 6, FIG. 7 shows examples of interrupt response processing time and interrupt restore processing time when saving and restoring to and from a stack area are performed using data transfer instructions without employing the register banks.

<<Register Bank Overflow Processing>>

Figure 8:
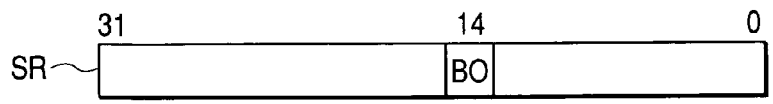
FIG. 8 is a diagram showing the placement of an overflow flag in a status register.

Next, register bank overflow processing will be described. An overflow of the register banks is made detectable by providing the status register SR with an overflow flag BO indicating an overflow of the register banks. FIG. 8 shows the overflow flag BO.

If an interrupt occurs in a state in which data has been saved to all banks of the register banks, and the interrupt accepted in the CPU 2 is permitted to use the register banks (register bank overflow), register set data is automatically saved to a stack area instead of the register banks. Automatic saving to and restoring from the stack area are performed as described below.

In save operation, according to the value of the stack pointer SP, the status register SR, the program counter PC, and the predetermined register set R0 to R14, GBR, MACH, MACL, and PR are saved to a stack area. Next, a register bank overflow bit BO of the status register SR is set to "1". A bank number BN of the bank number register IBNR is kept set to a maximum value.

If the RESBANK instruction is executed when the register bank overflow bit BO of the status register SR is set to "1", restore operation is performed as follows. According to the value of the stack pointer SP, data is restored from the stack area to the predetermined register set R0 to R14, GBR, MACH, MACL, and PR. A bank number BN of the bank number register IBNR is kept set to a maximum value.

On the other hand, if an interrupt occurs in a state in which data has been saved to all banks of the register banks, the interrupt accepted in the CPU 2 is permitted to use the register banks, and the execution of register bank error exception handling is selected by predetermined setting within the interrupt controller, the register bank error exception handling described below is started. First, the status register SR is saved to the stack area. Next, the program counter (PC) 27 is saved to the stack area. The value of the program counter (PC) 27 to be saved is the start address of an instruction next to the instruction last executed. An exception service routine address is fetched from an exception handling vector table corresponding to a register bank error that occurred, and a program is executed from the address. In this case, saving to the register banks is not performed and the bank number BN is unchanged. This is intended for applications requested to take necessary action, upon detecting that the register banks cannot be used due to an overflow of them. This function is effective to detect that desired performance is not obtained, and at least for debugging.

By the way, also when the register bank restore instruction (RESBANK instruction) is executed when the register banks are empty (BN=0), register bank error exception handling is performed. This is obviously abnormal operation that must be detected.

By providing the above-described overflow flag BO, when data is restored to a register set, an overflow of the register banks can be recognized. This helps to prevent the data processor from undesirable operation stop due to an overflow of the register banks.

<<Consideration of Task Switching>>

Figure 9:
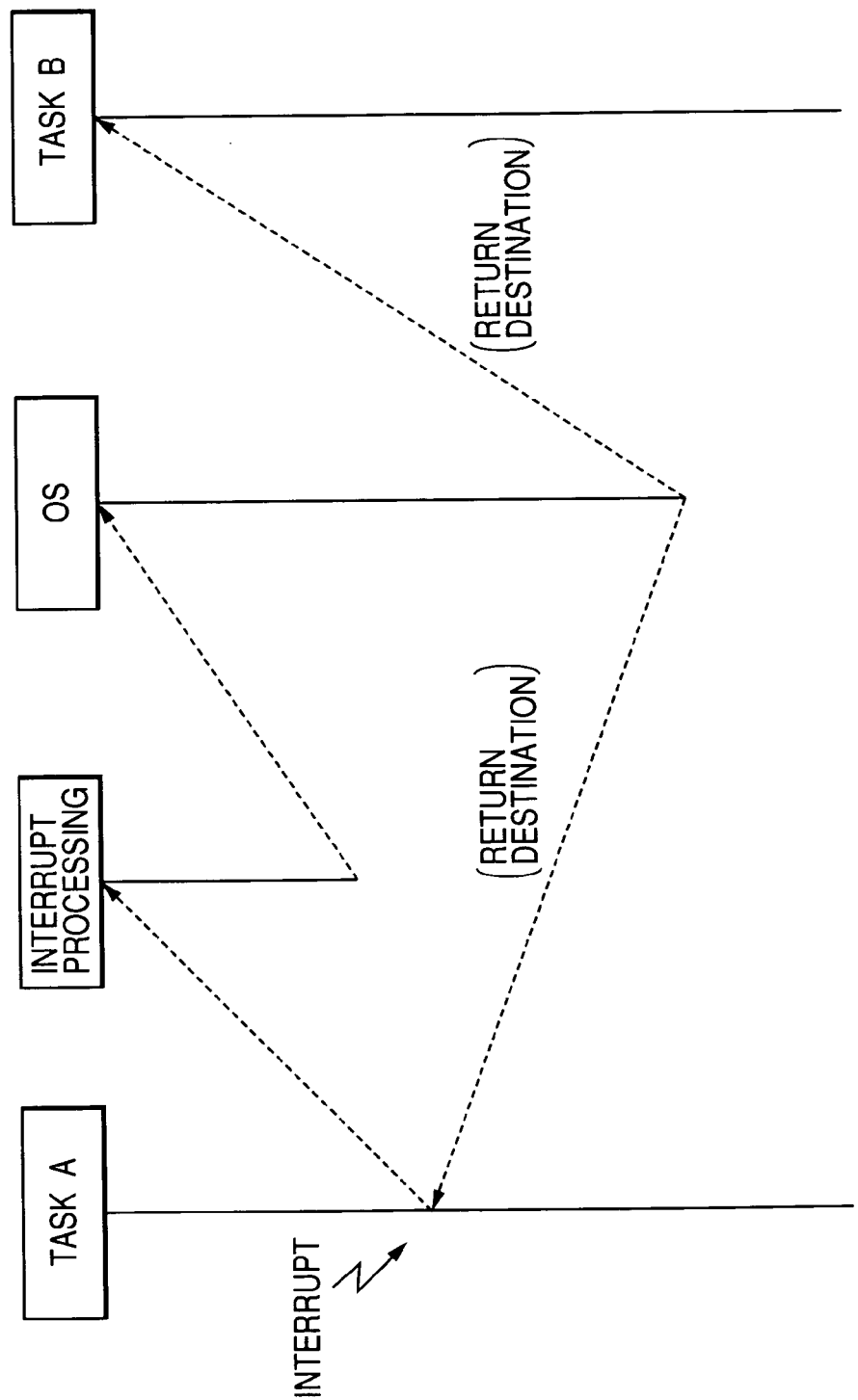
FIG. 9 is a diagram explaining that, when a CPU performs multitask processing under management of an OS, a return destination after interrupt service is not always an interrupt source, and tasks may be switched.

When the CPU 2 performs multitask processing under management of the OS, as shown in FIG. 9, a return destination after interrupt service is not always an interrupt source. Depending on the status of events managed by the OS, control may be returned to a different task (task B).

Figure 10:
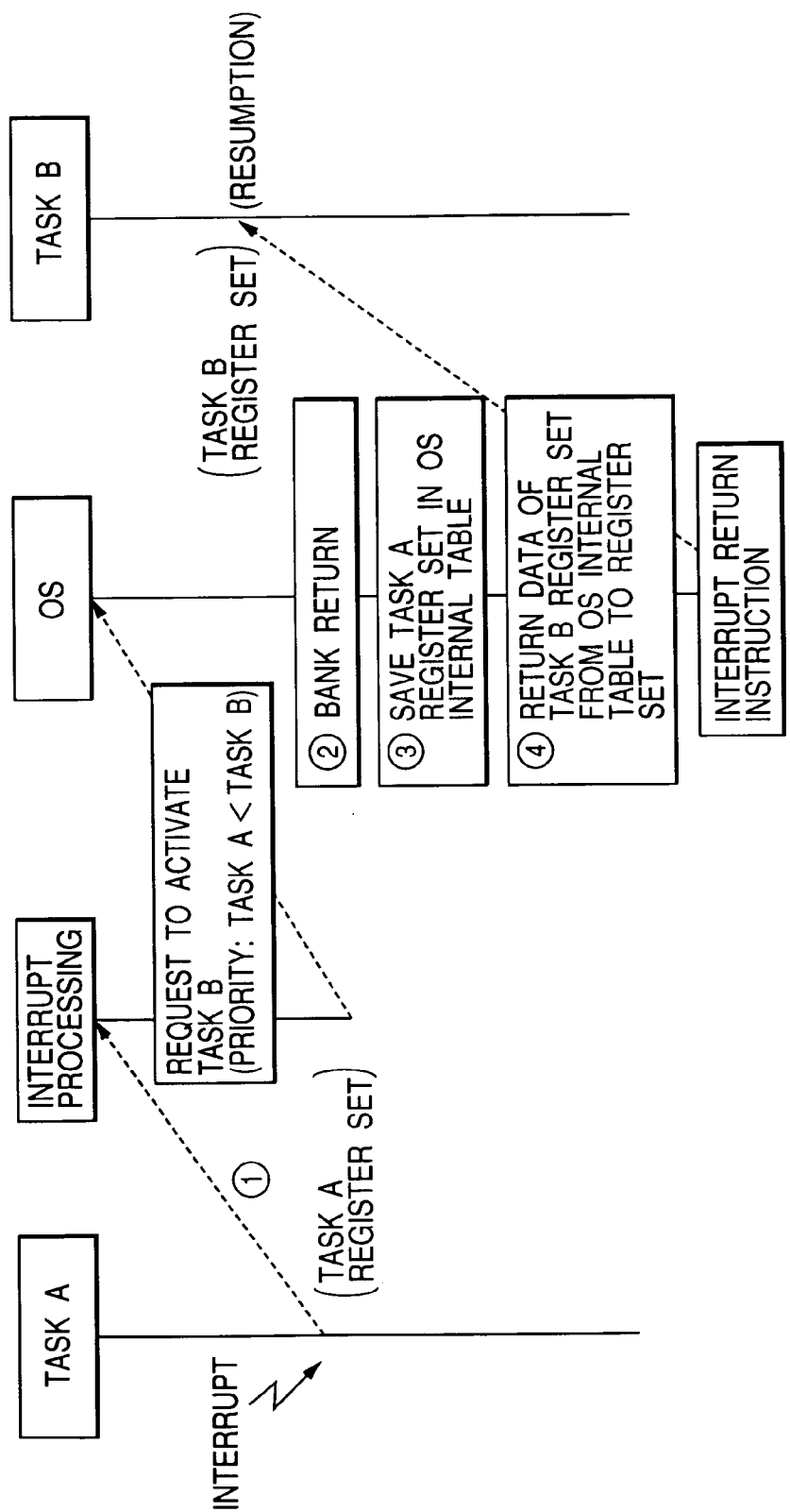
FIG. 10 is a diagram showing a processing procedure when task switching is performed.
Figure 11:
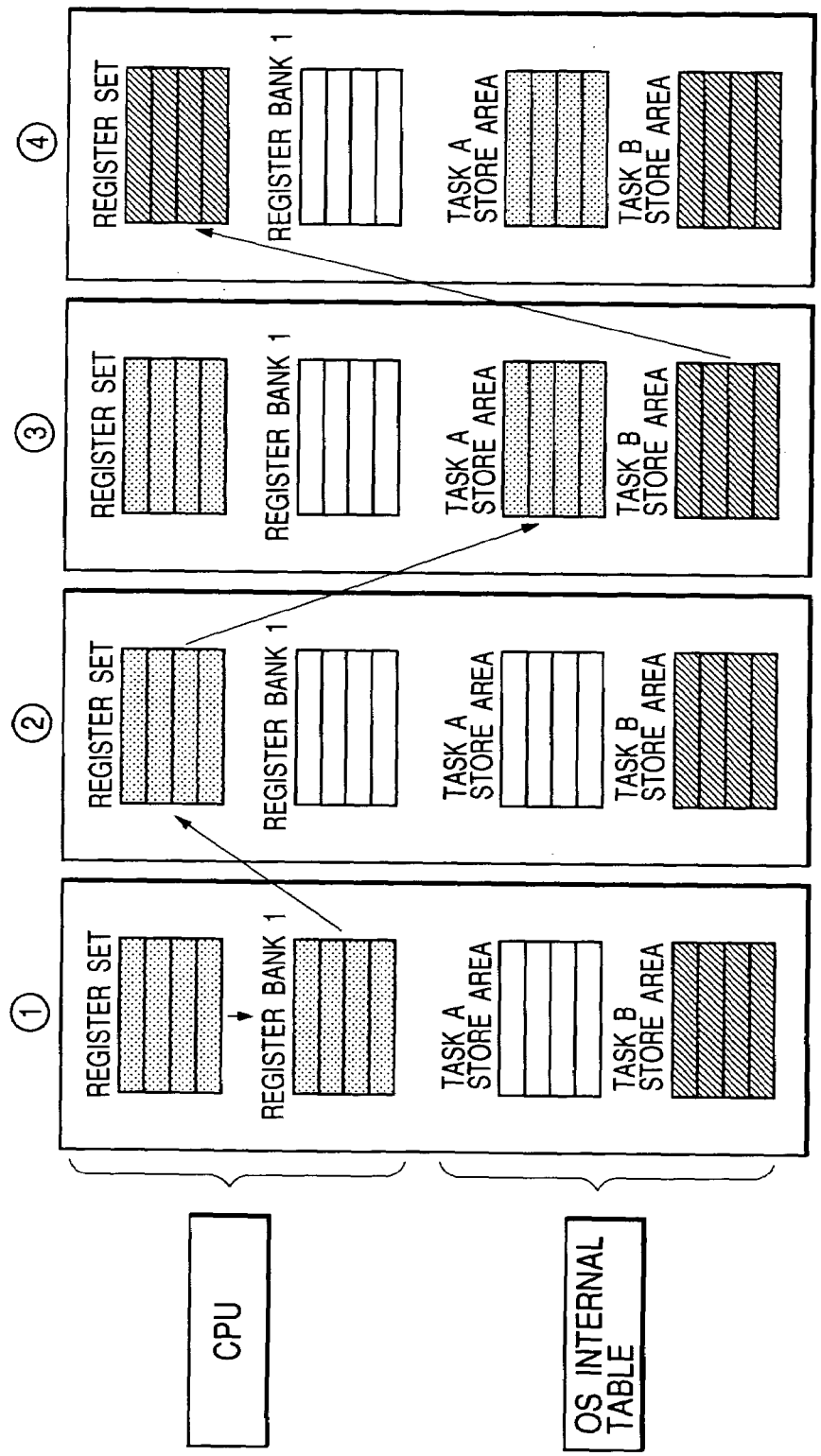
FIG. 11 is a diagram showing a relationship among a register set, register banks, and an OS internal table in processing of FIG. 10.

FIG. 10 shows a processing procedure when task switching is performed. FIG. 11 shows a relationship among a register set, register banks, and an OS internal table in processing of FIG. 10. We will examine tag switching by the above-described interrupt, with reference to FIGS. 10 and 11. The CPU 2 starts saving to the register banks in response to the occurrence of the interrupt exception handling (①). In an interrupt service routine, that is, within OS processing after the interrupt exception handling, the CPU 2 executes a RESBANK instruction to restore storage information from a register bank last saved to the predetermined register set (②). At this time, if task switching is performed depending on the status of events managed by the OS, the central processing unit stores the register set data of a task (task A) before the switching in an OS internal table (③), and restores the stored data of a register set on a task (task B) after the switching from the OS internal table to the register set (④). The processings of ③ and ④ are based on the OS. After a program counter value indicating of a return destination of the task B and the value of the status register are prepared in the stack area of the OS, the CPU 2 restores them from the stack area and executes a return instruction (RTE instruction) to enable return to program execution processing at a switching destination. The central processing unit separately has the RESBANK instruction (register restore instruction) and the RTE instruction (return instruction). This takes into account a case where the return from the OS in interrupt exception handling involves task switching. If task switching is not involved, the processings ③ and ④ by the OS following the register restore instruction become unnecessary, and there is no need to separate processing of the register restore instruction from processing of the return instruction. However, unifying the both instructions into one instruction makes task switching difficult and causes an overhead. In addition, unifying the both instructions into one instruction makes it necessary to specify operation corresponding to OS processing by parameters of instructions concerned, and produces the need to identify specification of addressing modes for an OS internal table and the processing routines to be executed differently depending on whether task switching is to be performed, increasing parameters and complicating instructions.

Since the RESBANK instruction (bank restore instruction) is used as an instruction exclusively used to restore banks, which is independent of the RTE instruction such as subroutine return instructions, the data processor smoothly and efficiently perform restoration from interrupts, whether task switching is involved or not, and is excellent in applicability to multitask processing.

<<Register Bank Transfer Instruction>>

Figures 12, 13:
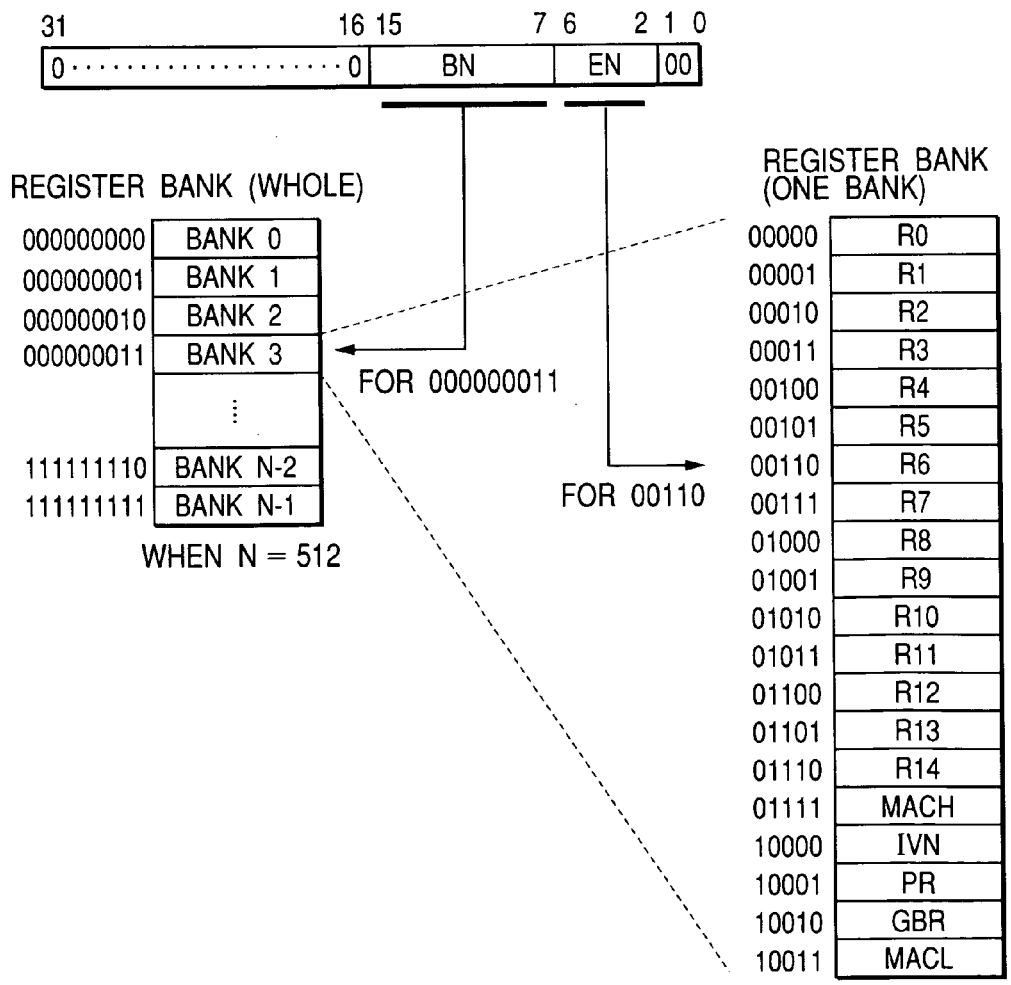
FIG. 12 is a diagram illustrating register bank transfer instructions.
FIG. 13 is a diagram illustrating correspondences between addresses specified by register bank transfer instructions and the entries of register banks.

An instruction set of the CPU 2 contains register bank transfer instructions as shown in FIG. 12. The register bank transfer instructions, which are instructions used for debugging, transfer arbitrary data of register banks to the general purpose register R0. An LDBANK instruction transfers 4-byte data from a register bank address indicated by Rm to R0. An STBANK instruction transfers R0 to a register bank address indicated by Rn.

FIG. 13 shows correspondences between addresses (the values of Rm for LDBANK and the values of Rn for STBANK) of register bank transfer instructions and the entries of register banks. A bank number is specified by bits 15 to 7 (BN) of address, and entries (R0 to R14, GBR, MACH, MACL, PR, IVN) within the bank are specified by bits 6 to 2 of the address. Bits 31 to 16 and bits 1 and 0 of the address are set to all-zeros.

Arbitrary data of register banks can be transferred by one register bank transfer instruction.

Hereinbefore, the invention made by the inventor has been described in detail based on embodiments. It goes without saying that the present invention is not limited to the embodiments, and variations and modifications may be made without departing from the scope of the present invention.

For example, coprocessor registers such as a floating-point operation unit (FPU) and a digital signal processing unit (DSP) may be contained in a register set and saved and restored together with the general purpose registers and the like. In cases where the coprocessors are used in interrupt service, if these registers are also saved and restored at the same time, performance is increased. However, it is necessary to devise interrupt handling so as not to use the coprocessor registers and provide more bank areas. Thereby, time required to save and restore the coprocessors can be cut.

If a number of bank areas equal to the number of interrupts cannot be allocated, a method referred to as interrupt selection type register banks may be used. When an interrupt occurs, if there is no empty bank, a stack area is used. In this case, there may occur a situation where interrupts of high levels cannot use banks, depending on an interrupt nest status; this is fatal to real-time systems. Therefore, if there is no empty bank, interrupts to use banks are made selectable to maintain real-time capability. This helps to improve interrupt performance in microcomputers with limited bank areas.

To be more specific, for each interrupt level, "bank interrupts (interrupt levels that always use banks)" and "don't care interrupt (interrupt levels that may use either of banks and stack)" are statically decided. When an interrupt occurs, if the interrupt is a bank interrupt, register banks are switched by a bank switching instruction (e.g., current bank 0→1). If it is a don't care interrupt, when the number of remaining banks minus the number of remaining interrupts is one or greater, banks are switched, and when 0, the contents of a current bank are saved to the stack, whereby the don't care interrupt also effectively uses the banks. Since register save destinations extend to banks and the stack, the CPU keeps track of how many stacking operations have been performed in which bank being used, a bank switching instruction switches banks on the basis of the information, and stack/pop control is performed. However, since this method requires bank and stack control, it has less effective performance and more complicated CPU hardware than the above-described interrupt bank method.

By providing register banks for all tasks respectively besides interrupts, register save and restore processing during task switching can be omitted. Task registers can be rapidly saved and restored. Since the hardware cannot recognize OS tasks, it is necessary to switch banks, based on information indicating which tasks are assigned to which banks. This method complicates CPU hardware and requires large-capacity banks, like the above-described method.

There is provided an area using a dedicated bus which is different from the RAM area. Memory access is enabled in parallel with other execution stages of an instruction, so that apparent memory access overhead is zeroed. This area is allocated to address space and can be accessed like normal memory areas. This area can be used as a memory area exclusively used for stack to speed up register saving and restoring and increase the performance of interrupt service and task processing. Also, its use can be expanded in combination with the RAM.

The register banks are not limited to a circuit allocated on the RAM for a register set within the CPU. Conceptually, they may be constituted by a register file that makes up plural register sets.

Effects obtained by representative examples of the invention disclosed in this application will be briefly described.

Since an overflow flag of the register banks is used, in data restoration to a register set, an overflow of the register banks can be recognized. This prevents the data processor from undesirable operation stop due to an overflow of the register banks.

Since a bank restore instruction is used as an instruction exclusively used to restore banks, which is independent of a return instruction, the data processor can smoothly and efficiently perform restoration from interrupts, whether task switching is involved or not, and is excellent in applicability to multitask processing.

Concurrent saving of plural registers reduces interrupt service time. By connecting a bank area over a dedicated bus to perform parallel processing, apparent overhead of register save and restore processing can be reduced.

What is claimed is:

1. A data processor comprising:
   a status register;
   a central processing unit including a predetermined register set; and
   a plurality of register banks corresponding to the predetermined register set,
   wherein the status register includes an overflow flag to indicate an overflow of the plurality of register banks,
   wherein the central processing unit operates to store information from the predetermined register set to one of the plurality of register banks when an interrupt occurs and the overflow flag indicates non-occurrence of the overflow of the plurality of register banks, and
   wherein the central processing unit operates to store information from the predetermined register set to a stack area when an interrupt occurs and the overflow flag indicates occurrence of the overflow of the plurality of register banks.

2. The data processor according to claim 1,
wherein, when an interrupt exception occurs in a state in which data has been saved to all banks of the register banks, and an accepted interrupt exception is permitted to use the register banks, the central processing unit saves data of the register set to a stack area and reflects an overflow state in the overflow flag.

3. The data processor according to claim 2,
wherein, when the overflow flag indicates an overflow state, if data restoration from the register banks to the register set is directed, the central processing unit restores the data from the stack area to the register set.

4. The data processor according to claim 1,
wherein, when an interrupt exception occurs in a state in which data has been saved to all banks of the register banks, and an accepted interrupt exception is permitted to use the register banks and specified to execute a predetermined exception handling routine, the central processing unit executes the predetermined exception handling routine and does not perform saving to the register banks.

5. The data processor according to claim 1, comprising:
a memory having the plurality of register banks; and
a bus dedicated to couple the memory and the predetermined register set,
wherein the bus has a plurality of bit lines which are operable to transfer data from a plurality of registers of the register set.

6. The data processor according to claim 1,
wherein the central processing unit, in response to the occurrence of an interrupt exception, saves information from the status register and a program counter to the stack area, and saves information from the predetermined register set to the register banks.

7. The data processor according to claim 6,
wherein an operation to save to the register banks can be selected according to factors indicating types of interrupts or priority levels.

8. The data processor according to claim 6, which processes interrupts to perform saving to the register banks and interrupts capable of selecting a stack area as a save location when the number of remaining banks is smaller than the number of remaining interrupts to perform saving to the register banks.

9. The data processor according to claim 6,
wherein the central processing unit includes in an instruction set a register restore instruction to restore storage information from a register bank last saved to the predetermined register set.

10. The data processor according to claim 9,
wherein, if the register restore instruction is executed when the register banks are empty, predetermined exception service occurs.

11. The data processor according to claim 9,
wherein the instruction set includes a return instruction to restore a value of the program counter and a value of the status register stored in a stack area in interrupt exception handling and enable return to previous program execution processing.

* * * * *